Arnold C. Fields
Inventor
by Robert J. Palmer
Attorney

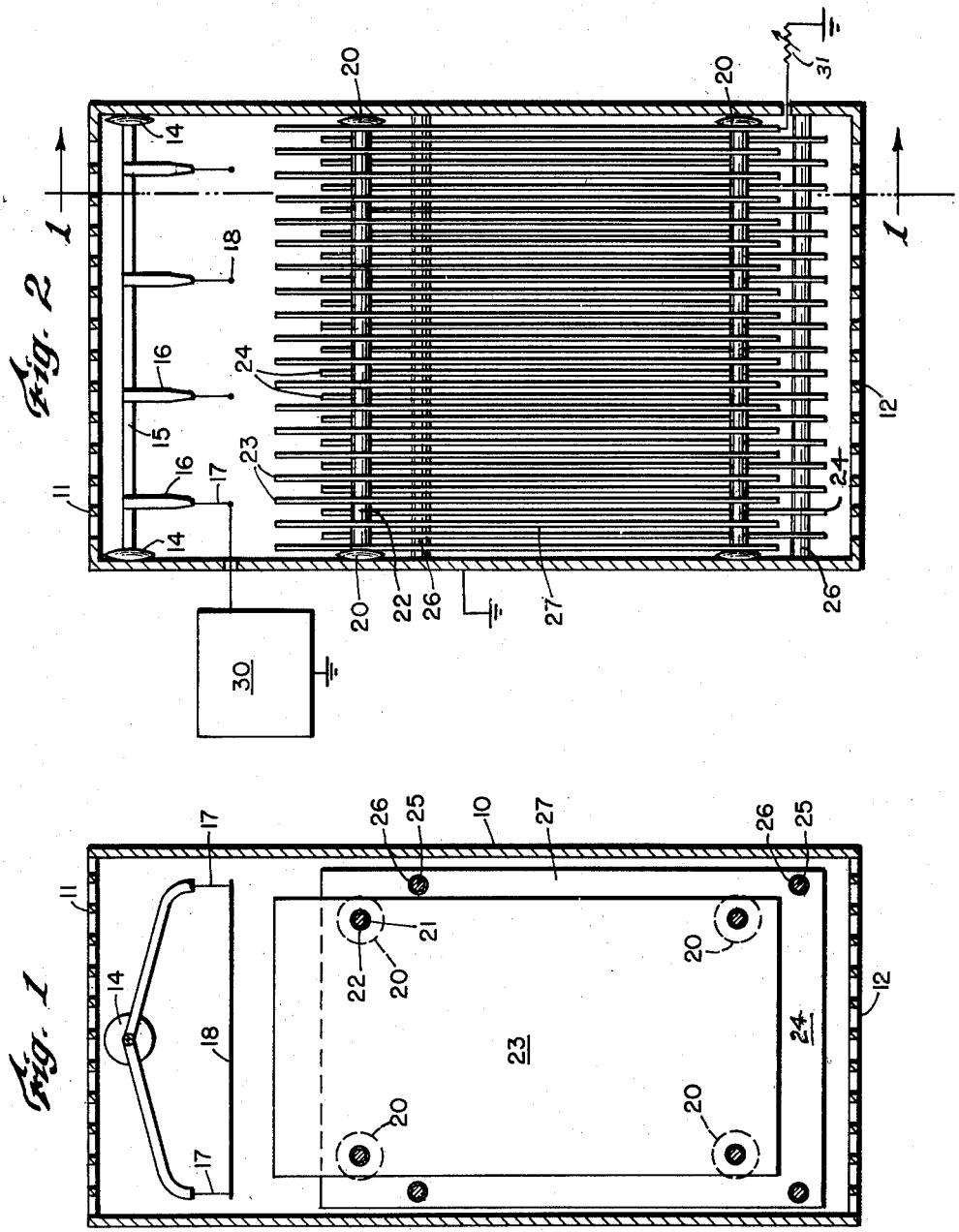

United States Patent Office 2,798,572
Patented July 9, 1957

2,798,572

ELECTROSTATIC PRECIPITATORS

Arnold C. Fields, Medfield, Mass., assignor to Westinghouse Electric Corporation, East Pittsburgh, Pa., a corporation of Pennsylvania Application August 30, 1955, Serial No. 531,342

8 Claims. (Cl. 183—7)

This invention relates to electrostatic precipitators for removing small foreign particles such as dust from gases such as air.

Many commonly used electrostatic precipitators for cleaning air have separate ionizer and collector electrodes, and have power packs which deliver two different voltages, one for the ionizer electrodes, and the other for the collector electrodes. A typical ionizer voltage is 12 kv. direct current, and a typical collector voltage is 6 kv. direct current. Such power packs are relatively costly since they usually require two voltage doubling rectifier tubes, and two high voltage capacitors. Some precipitators have been designed to use a single direct current voltage, about 10 kv. for both the ionizer and collector. Experience has shown that this voltage is insufficient for efficient ionization, and is too high for proper collection since in order to avoid spark-over it has been necessary to space the collector electrodes too far apart for efficient collection.

My co-pending application, Serial No. 472,075, discloses methods of obtaining the relatively low voltages for the collector electrodes by probe electrodes extending into the ionization field between the usual ionizer wires and non-discharging ionizer electrodes, and acting as auxiliary non-discharging ionizer electrodes.

In the present invention, I do not use non-discharging ionizer electrodes at opposite sides of ionizer wires in the usual manner, but use instead the upstream edges of the collector plates of a collector cell as the non-discharging ionizer electrodes. The upstream edges of the charge plates of the collector cell preferably extend closer to the ionizer wires than do the upstream edges of the grounded plates and are charged to a desired voltage lower than that of the ionizer wires.

Preferably, the charge plates are connected to ground through a resistance which may be variable, and which provides a voltage drop which determines the voltage on the charge plates. Ionization current flows continuously through this resistance so that there is always a charge due to ionization current, on the charge plates. This is to be distinguished from other proposed methods in which electrodes are inserted within electrostatic fields in which there is no ionization current flow to ground, and in which the electrodes take on charges by so-called "electrostatic induction." In such methods since there is no ionization current flowing to the electrodes, there can be no electrostatic charging of dust or other foreign particles.

Tests of precipitators embodying this invention have shown that with efficiencies and air velocities comparable to those of conventional precipitators, less than one-half the ionization current is required.

An object of this invention is to reduce the cost of electrostatic precipitators used for cleaning air.

Another object of this invention is to reduce the ionization current charging by an electrostatic precipitator.

This invention will now be described with reference to the annexed drawings, of which:

Fig. 1 is an end section of an electrostatic precipitator embodying this invention, the section being taken along the line 1—1 of Fig. 2;

Fig. 2 is a side section of the precipitator;

Figure 3:
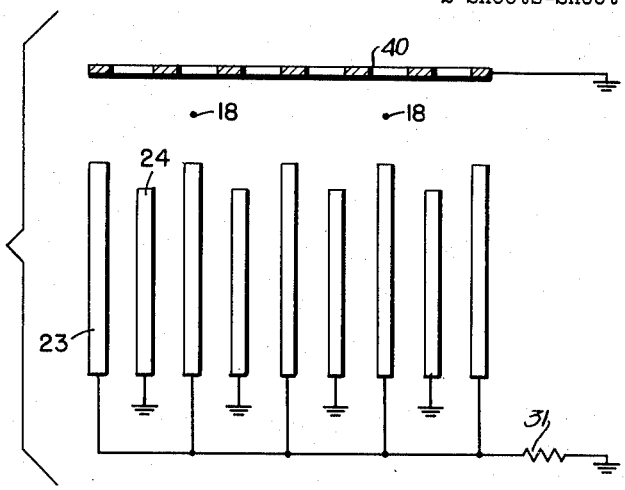
Fig. 3 is a partial side view of another embodiment of this invention in which a metal screen upstream of the ionizer wires serves as an auxiliary ionizer electrode.

Referring first to Figs. 1 and 2, the precipitator there illustrated has a casing 10 with an air inlet 11 and an air outlet 12. Disc-shaped insulators 14 are attached to the inner surfaces of the opposite sides of the casing adjacent the inlet 11, and have a metal rod 15 extending therebetween. Metal ionizer wire supports 16 are attached to the rod 15 and have attached thereto the small ionizer wire supporting rods 17 of spring metal. The ionizer wires 18 are supported by the rods 17.

Disc-shaped insulators 20 are attached to the end walls of the casing, and have tie rods 21 extending therebetween. Spacers 22 extend around the tie rods in contact with charge collector plates 23 and pass through clearance openings in ground collector plates 24. Tie rods 25 extend between end walls of the casing, and have spacers 26 therearound in contact with ground plates 24, the spacers 26 passing through clearance openings in the charge plates.

A single voltage power pack 30 has a +12 kv. terminal connected to the ionizer wires, and has its negative terminal grounded and connected to the ground collector plates 24 and to the casing 10.

A variable resistor 31 is connected between the charge plates 23 and ground. Ionization current flows through this resistor, the voltage drop thereacross determining the voltage on the charge plates.

The upstream edges of the charge plates 23 extend closer to the ionizer wires 18 than do the upstream edges of the ground plates 24 so that they extend into the corona or ionization field between the wires and the upstream edges of the ground plates.

The collector plates in a successfully operated embodiment of this invention were only 0.025 of an inch thick and were spaced only 0.1 of an inch apart, providing reduced plate cost, and laminar flow.

In the operation of Figs. 1 and 2, when the power pack 30 is turned on, ionization current will flow between the ionizer wires, the upstream edges of the ground plates 24 and ground. Ionization current will also flow between the ionizer wires, the upstream edges of the charge plates 23, the resistor 31 and ground. The positions of the upstream edges of the charge plates 23 in the ionization field between the wires 18 and the upstream edges of the ground plates 24, and the value of the resistor 31, determine the voltage on the charge plates.

Ionization of the air between the wires and the upstream edges of the collector plates causes electrostatic charges to be added to foreign particles entrained in the air. Otherwise the precipitator action is conventional, the charged dust particles depositing upon the oppositely charged plates. Tests of working models have shown that the ionization current for a precipitator embodying this invention is less than one-half that of a conventional one. Since the cost of a power pack is a substantial part of the overall cost of a precipitator, the reduction in the capacity of a power pack results in a sizeable reduction in the overall cost. Also the elimination of the usual non-discharging ionizer electrodes provides another substantial saving in cost, and all this without sacrifice in efficiency.

It is usual to provide perforated metal screens upstream of the ionizer wires, and as shown by Fig. 3, such a screen 40 is used as an auxiliary ionizer electrode, providing an ionization field upstream as well as downstream of the ionizer wires.

Figure 4:
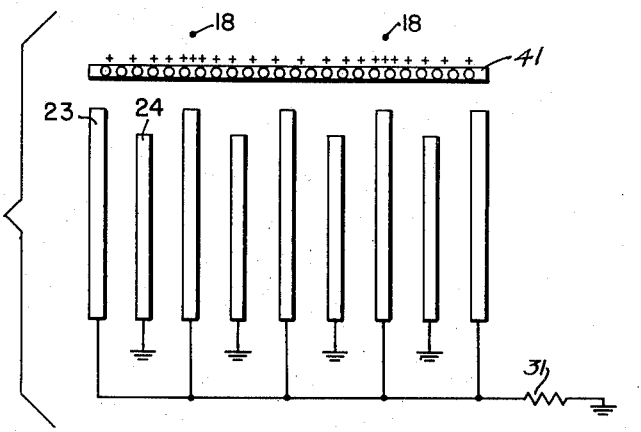
Fig. 4 is a partial side view of another embodiment of this invention in which a dielectric screen is placed between the ionizer wires and the collector plates for broadening the ionization field, making it more intense at the plate edges more remote from the wires.

As can be seen from Fig. 2, some of the collector plates are further from the ionizer wires than the others, resulting in weaker ionization fields between the wires and the most remote plates than between the wires and the nearer plates. Fig. 4 shows a dielectric screen 41 between the ionizer wires and the collector plates. Such a screen would assure a distributed potential which would tend to repel the positive ions flowing between the wires and the plates, forcing them to take longer paths between the wires and the plates as shown by Fig. 4.

Figure 5:
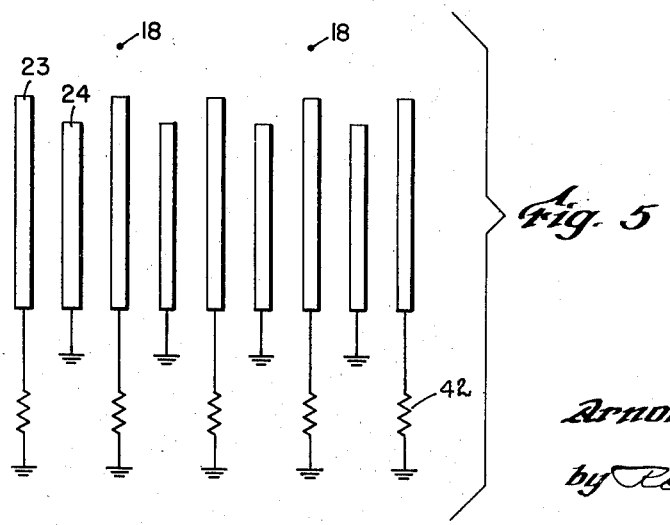
Fig. 5 is a diagrammatic view illustrating the use of separate resistors for connecting the charge collector plates to ground.

Since some of the charge plates 23 will be further from the ionizer wires than others, the closer plates will assume higher charges than the more remote ones. For compensating for this, each charge plate 23 can be connected as shown by Fig. 5, to ground through an individual resistor 42, each of which can be selected or adjusted to provide a voltage drop which will equalize the voltages on the charge plates.

While embodiments of this invention have been described for the purpose of illustration, it should be understood that the invention is not limited to the exact apparatus and arrangement of apparatus illustrated and described, since modifications thereof may be suggested by those skilled in the art without departure from the essence of the invention.

What I claim as my invention, is:

1. An electrostatic precipitator comprising a plurality of spaced-apart parallel collector plates, means for grounding alternate ones of said plates, means for insulatedly supporting the others of said plates, ionizer wires upstream with respect to air flow of said plates, the upstream edges of said others of said plates extending closer to said wires than the upstream edges of said alternate plates, and means including a resistance for connecting said other plates to ground.

2. An electrostatic precipitator as claimed in claim 1 in which the resistance comprises a resistor connected to each of said other plates and to ground.

3. An electrostatic precipitator comprising a plurality of spaced-apart, parallel collector plates, means for grounding alternate ones of said plates, means for insulatedly supporting the others of said plates, ionizer wires upstream with respect to air flow of said plates, the upstream edges of said other plates extending closer to said wires than the upstream edges of said alternate plates, and a single voltage power pack having a high voltage terminal connected to said wires; and a ground terminal connected to ground, said upstream edges of said plates forming the sole non-discharging ionizer electrode means for said precipitator.

4. An electrostatic precipitator as claimed in claim 3 in which means including a resistance is provided for connecting said other plates to ground.

5. An electrostatic precipitator as claimed in claim 4 in which the resistance comprises a resistor connected to each of said other plates and to ground.

6. An electrostatic precipitator as claimed in claim 3 in which a dielectric screen is provided between the ionizer wires and the upstream edges of the collector plates.

7. An electrostatic precipitator as claimed in claim 1 in which a dielectric screen is provided between the ionizer wires and the upstream edges of the collector plates.

8. An electrostatic precipitator as claimed in claim 1 in which a perforated metal screen is provided on the opposite sides of the ionizer wires from the collector plates, and is grounded, the sole ionization fields being produced between said wires and said plates and between said wires and said screen.

References Cited in the file of this patent

UNITED STATES PATENTS

| | | |
|---|---|---|
| 2,008,246 | Deutsch | July 16, 1935 |
| 2,188,695 | Wintermute | Jan. 30, 1940 |
| 2,639,781 | Savitz | May 26, 1953 |